US012571191B2

(12) United States Patent
Koyala et al.

(10) Patent No.: US 12,571,191 B2
(45) Date of Patent: Mar. 10, 2026

(54) SYSTEM AND METHODS FOR TOUCHLESS FAUCET OVERRIDE

(71) Applicant: Kohler Co., Kohler, WI (US)

(72) Inventors: Govinda Rao Koyala, Sheboygan, WI (US); Gabriel Maclean Niederlander, Wauwatosa, WI (US)

(73) Assignee: Kohler Co., Kohler, WI (US)

( * ) Notice: Subject to any disclaimer, the term of this patent is extended or adjusted under 35 U.S.C. 154(b) by 89 days.

(21) Appl. No.: 18/482,705

(22) Filed: Oct. 6, 2023

(65) Prior Publication Data

US 2024/0151014 A1 May 9, 2024

Related U.S. Application Data

(60) Provisional application No. 63/378,615, filed on Oct. 6, 2022.

(51) Int. Cl.
*E03C 1/05* (2006.01)
*F16K 31/06* (2006.01)
(52) U.S. Cl.
CPC .......... *E03C 1/057* (2013.01); *F16K 31/0675* (2013.01)
(58) Field of Classification Search
USPC ................................................... 251/129.04
See application file for complete search history.

(56) References Cited

U.S. PATENT DOCUMENTS

| | | | |
|---|---|---|---|
| 4,604,764 A | 8/1986 | Enzo | |
| 4,735,357 A | 4/1988 | Gregory et al. | |
| 4,839,039 A | 6/1989 | Parsons et al. | |
| 4,894,874 A * | 1/1990 | Wilson ................... | E03C 1/057 |
| | | | 251/129.04 |
| 5,555,912 A * | 9/1996 | Saadi ..................... | E03C 1/057 |
| | | | 4/678 |
| 5,586,746 A * | 12/1996 | Humpert ................ | E03C 1/057 |
| | | | 251/129.04 |
| 5,893,387 A | 4/1999 | Paterson et al. | |
| 5,915,417 A * | 6/1999 | Diaz ..................... | E03C 1/057 |
| | | | 137/624.11 |
| 6,019,130 A | 2/2000 | Rump | |
| 6,202,980 B1 * | 3/2001 | Vincent ................... | E03C 1/05 |
| | | | 251/129.04 |
| 6,219,859 B1 | 4/2001 | Derakhshan | |
| 6,340,032 B1 | 1/2002 | Zosimadis | |
| 6,341,389 B2 | 1/2002 | Philipps-Liebich et al. | |
| 6,508,272 B1 | 1/2003 | Parsons et al. | |
| 6,874,535 B2 | 4/2005 | Parsons et al. | |

(Continued)

FOREIGN PATENT DOCUMENTS

| | | |
|---|---|---|
| EP | 1124019 A1 | 8/2001 |
| EP | 2690328 A1 | 1/2014 |

(Continued)

*Primary Examiner* — Matthew W Jellett
(74) *Attorney, Agent, or Firm* — Husch Blackwell LLP

(57) ABSTRACT

Methods and systems for manually overriding a touchless faucet system using an electronic or mechanical bypass. In a mechanical override system, the system includes a movably attached system that controls the touchless functionality of the faucet. In an electronic override system, the system includes a control box with which a user can interact to bypass or disable the touchless functionality of the faucet.

14 Claims, 8 Drawing Sheets

(56) References Cited

U.S. PATENT DOCUMENTS

| 6,932,316 | B2* | 8/2005 | Herbert | F16K 31/0672 |
| | | | | 251/30.02 |
| 6,962,168 | B2 | 11/2005 | McDaniel et al. | |
| 7,083,156 | B2 | 8/2006 | Jost et al. | |
| 7,150,293 | B2 | 12/2006 | Jonte | |
| 7,174,577 | B2 | 2/2007 | Jost et al. | |
| 7,320,146 | B2 | 1/2008 | Nortier et al. | |
| 7,396,000 | B2* | 7/2008 | Parsons | F16K 19/006 |
| | | | | 4/304 |
| 7,464,418 | B2 | 12/2008 | Seggio et al. | |
| 7,503,338 | B2 | 3/2009 | Harrington et al. | |
| 7,537,023 | B2 | 5/2009 | Marty et al. | |
| RE42,005 | E | 12/2010 | Jost et al. | |
| 7,945,973 | B2 | 5/2011 | Khorshid | |
| 8,132,592 | B2 | 3/2012 | Harrington et al. | |
| 8,162,236 | B2 | 4/2012 | Rodenbeck et al. | |
| 8,572,772 | B2 | 11/2013 | Wolf et al. | |
| 8,739,815 | B2 | 6/2014 | Harrington et al. | |
| 8,863,774 | B2 | 10/2014 | Wang | |
| 8,944,105 | B2 | 2/2015 | Rodenbeck et al. | |
| 9,010,377 | B1 | 4/2015 | O'brien et al. | |
| 9,062,790 | B2 | 6/2015 | Esche et al. | |
| 9,074,698 | B2 | 7/2015 | Esche et al. | |
| 9,164,518 | B2 | 10/2015 | Houghton | |
| 9,341,278 | B2 | 5/2016 | Esche | |
| 9,458,612 | B2 | 10/2016 | Thomas et al. | |
| 9,528,249 | B2 | 12/2016 | Gompper | |
| 9,624,655 | B2 | 4/2017 | Gregory et al. | |
| 9,632,514 | B2 | 4/2017 | Marty et al. | |
| 9,695,580 | B2 | 7/2017 | Esche et al. | |
| 9,758,951 | B2 | 9/2017 | Evans et al. | |
| 9,816,634 | B2 | 11/2017 | Wawrla et al. | |
| 9,822,514 | B2 | 11/2017 | Parsons et al. | |
| 9,822,902 | B2 | 11/2017 | Esche et al. | |
| 9,919,939 | B2 | 3/2018 | Rosko et al. | |
| 10,087,608 | B2 | 10/2018 | Dobizl et al. | |
| 10,113,739 | B2 | 10/2018 | Schneider | |
| 10,138,622 | B2 | 11/2018 | Thomas et al. | |
| 10,227,759 | B2 | 3/2019 | Li et al. | |
| 10,260,653 | B2 | 4/2019 | Esche et al. | |
| 10,273,669 | B2 | 4/2019 | Esche et al. | |
| 10,392,786 | B2 | 8/2019 | Lance et al. | |
| 10,458,565 | B2 | 10/2019 | Esche | |
| 10,480,165 | B2 | 11/2019 | Reeder et al. | |
| 10,550,556 | B2 | 2/2020 | Bush | |
| 10,612,767 | B2 | 4/2020 | Schneider | |
| 10,675,573 | B2 | 6/2020 | Miller et al. | |
| 10,934,695 | B2 | 3/2021 | Warsowe | |
| 10,947,138 | B2 | 3/2021 | Rosko et al. | |
| 11,085,176 | B2 | 8/2021 | Thomas et al. | |
| 12,077,952 | B2* | 9/2024 | Smith | F16K 37/0058 |
| 2002/0166986 | A1 | 11/2002 | Remby et al. | |
| 2005/0253102 | A1 | 11/2005 | Boilen | |
| 2006/0186215 | A1 | 8/2006 | Logan | |
| 2009/0293192 | A1 | 12/2009 | Pons | |
| 2010/0287695 | A1 | 11/2010 | Houghton et al. | |
| 2013/0174926 | A1 | 7/2013 | Derakhshan | |
| 2015/0033469 | A1 | 2/2015 | Ferrante | |
| 2019/0085541 | A1 | 3/2019 | Anderson et al. | |
| 2020/0299941 | A1 | 9/2020 | Veros et al. | |
| 2020/0385966 | A1 | 12/2020 | Chaky | |
| 2021/0164203 | A1 | 6/2021 | Mavinahally et al. | |
| 2021/0179461 | A1 | 6/2021 | Rosko et al. | |
| 2021/0388584 | A1 | 12/2021 | Thomas et al. | |

FOREIGN PATENT DOCUMENTS

| EP | 3736386 | A1 | 11/2020 |
| WO | WO1991017377 | A1 | 11/1991 |
| WO | WO2007082301 | A2 | 7/2007 |
| WO | WO2009095879 | A2 | 8/2009 |
| WO | WO2012125054 | A2 | 9/2012 |
| WO | WO2015079851 | A1 | 6/2015 |
| WO | WO2019209210 | A2 | 10/2019 |

* cited by examiner

102

110

112A

106

108

112B

102

222

300

SYSTEM AND METHODS FOR TOUCHLESS FAUCET OVERRIDE

CROSS-REFERENCE TO RELATED APPLICATIONS

The present application claims the benefit and priority of U.S. Provisional Application No. 63/378,615, filed Oct. 6, 2022, which is hereby incorporated by reference in its entirety.

BACKGROUND

The present disclosure relates generally to a touchless faucet system. More specifically, the present disclosure relates to manual override systems that either electronically or mechanically override the touchless functionality of a touchless faucet system. When engaged, the touchless faucet override system allows the faucet system to be operated manually.

SUMMARY

Examples of a touchless faucet override systems for a touchless faucet system can include an electronic touchless faucet override system which may include a control box with a switch or other actuator that can override the touchless functionality of the touchless faucet system. In one such example, the control box can control an electronic valve, such as a solenoid valve, that directs water flow into the touchless faucet system.

In a non-limiting example, the electronic override system can be installed to the touchless faucet system beneath a deck to which the touchless faucet system is affixed so that the electronic override system is not ordinarily visible to the user. In another example, the electronic override system can be positioned above deck and optionally hidden, such as part of an air gap assembly or soap dispenser, or located on the faucet itself, such that the user can easily access the override system.

In an instance where the touchless faucet system's power fails and the touchless functionality consequently fails, or in the event the user desires that the touchless functionality is disabled, for example, the faucet will be unused for an extended period of time, the user can bypass the touchless functionality by performing one or several discrete operations on the control box, such as interacting with the switch. The control box can also have an LED light or some other visual indicator that signals to the user that some status of the touchless faucet system has changed, such as the available supply of a power source or an indication of a user manual override of the system.

Another example of an override system for a touchless faucet system can include a mechanical touchless faucet override system that consists of a grouping of valve components that can be connected in order to function when the element controlling the touchless faucet system functionality is removed. The mechanical touchless faucet override system can include modular end-fittings that allow the touchless faucet override system to be installed in various families of touchless faucet systems.

In one example, the mechanical touchless faucet override system can be installed to the touchless faucet system beneath the deck the touchless faucet system is affixed to so that it is not ordinarily visible to the user. In another example, the mechanical touchless faucet override system can be positioned above deck and optionally hidden, such as part of an air gap assembly or soap dispenser, or located on the faucet itself, such that the user can easily access the override system.

In an instance where the touchless faucet system's functionality fails or in the event the user desires that the touchless functionality is disabled, for example, the faucet will be unused for an extended period of time, the user can bypass the touchless, the user can bypass the portion of the system that controls the touchless faucet functionality (e.g. control box) by mechanically removing the portion of the system and subsequently fitting a fluid inlet to a fluid outlet.

BRIEF DESCRIPTION OF THE DRAWINGS

Subject matter hereof may be more thoroughly understood in consideration of the following detailed description of various examples in connection with the accompanying figures, in which.

Figure 1A:
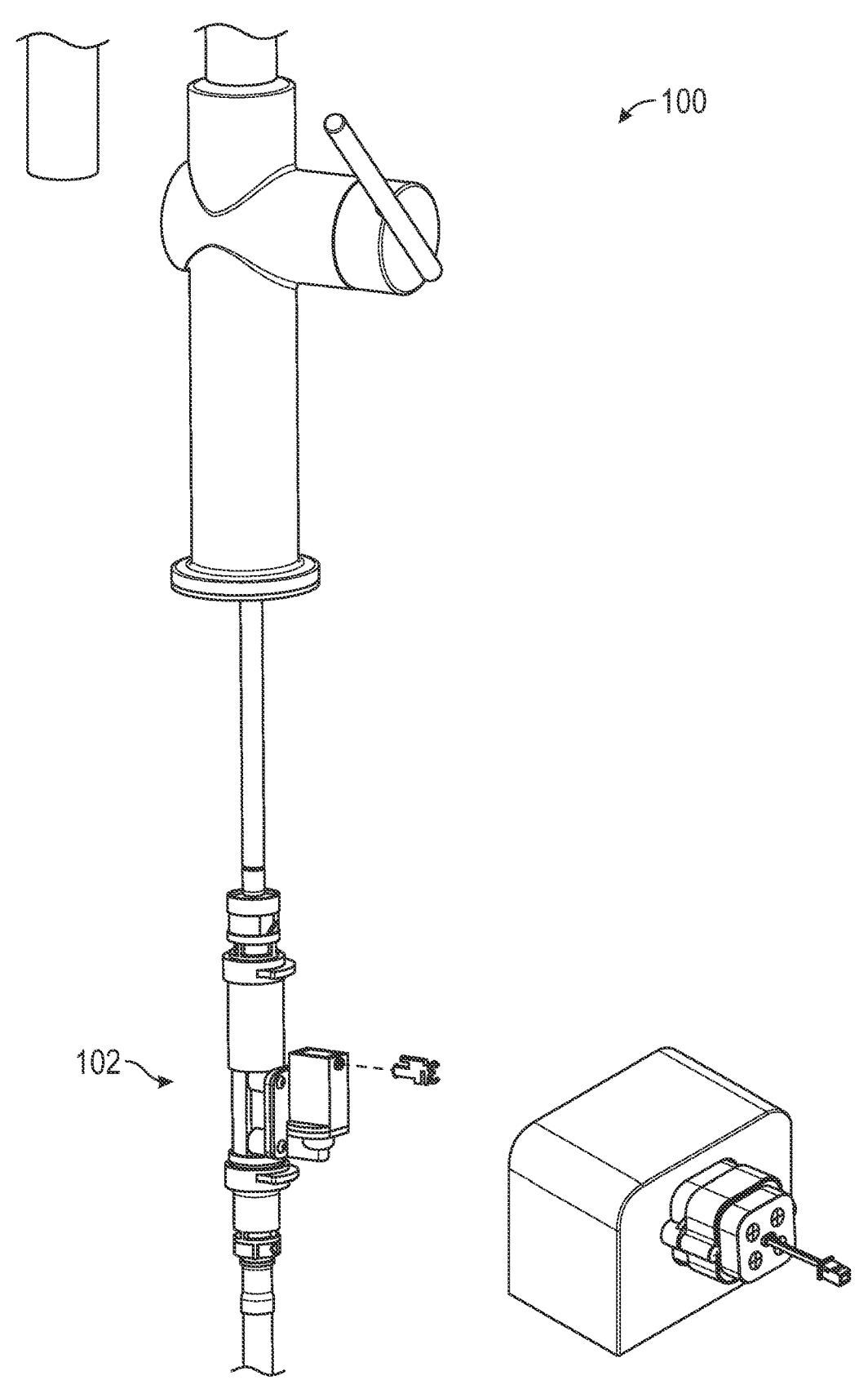
FIG. 1A is a perspective view of the touchless faucet system and the installed mechanical touchless faucet override system.

While various examples are amenable to various modifications and alternative forms, specifics thereof have been shown by way of example in the drawings and will be described in detail. It should be understood, however, that the intention is not to limit the claimed inventions to the particular examples described. On the contrary, the intention is to cover all modifications, equivalents, and alternatives falling within the spirit and scope of the subject matter of the present disclosure.

DETAILED DESCRIPTION OF THE DRAWINGS

Referring generally to the FIGURES, disclosed herein are touchless faucet override systems for touchless faucet systems. The touchless faucet override systems of the present disclosure allow a user to bypass a touchless faucet system in an instance where the functionality of the touchless faucet system fails. The functionality of the touchless system may fail, for example, when the touchless faucet system loses power. The override systems of this applicant can facilitate continued use of a touchless faucet system by manual means.

According to an example, a touchless faucet override system can include a mechanical component that facilitates a removal and subsequent bypass of a malfunctioning touchless faucet system.

According to another example, a touchless faucet override system can include an electronic component that facilitates a bypass of a malfunctioning touchless faucet system.

FIG. 1A illustrates an example of a mechanical touchless faucet override system 100 installed into a touchless faucet system 100. The mechanical touchless faucet override system 100 comprises a distal end fitting 106, a channel 110, a touchless electrical control 102, and a proximal end fitting 108. The proximal end fitting 108 connects the touchless faucet system 100 and the mechanical touchless faucet override system 100 to a fluid source (not pictured). A distal end fitting 106 connects the mechanical override system 100 to the faucet body and head (not pictured). The touchless electrical control 102 is affixed to the channel 110. The channel 110 is affixed to the distal end fitting 106 and the proximal end fitting 108 by a plurality of security clips 112A and 112B. In this example, one security clip 112B is located on the proximal part of the channel 110 and one security clip 112A is located on the distal end fitting 106.

The touchless electrical control 102 can receive input from the touchless faucet system 100. The touchless electrical control 102 can be configured to interpret the input from the touchless faucet system 100 and subsequently execute an output. For example, if the touchless electrical control 102 receives a specific input from the touchless faucet system 100, the touchless electrical control 102 opens a valve 105 (pictured in FIG. 1B), which directs fluid flow through the channel 110. A separate, subsequent input could direct the touchless electrical control 102 to close the valve 105 it had previously opened, severing the water flow through the channel 110.

Figure 1B:
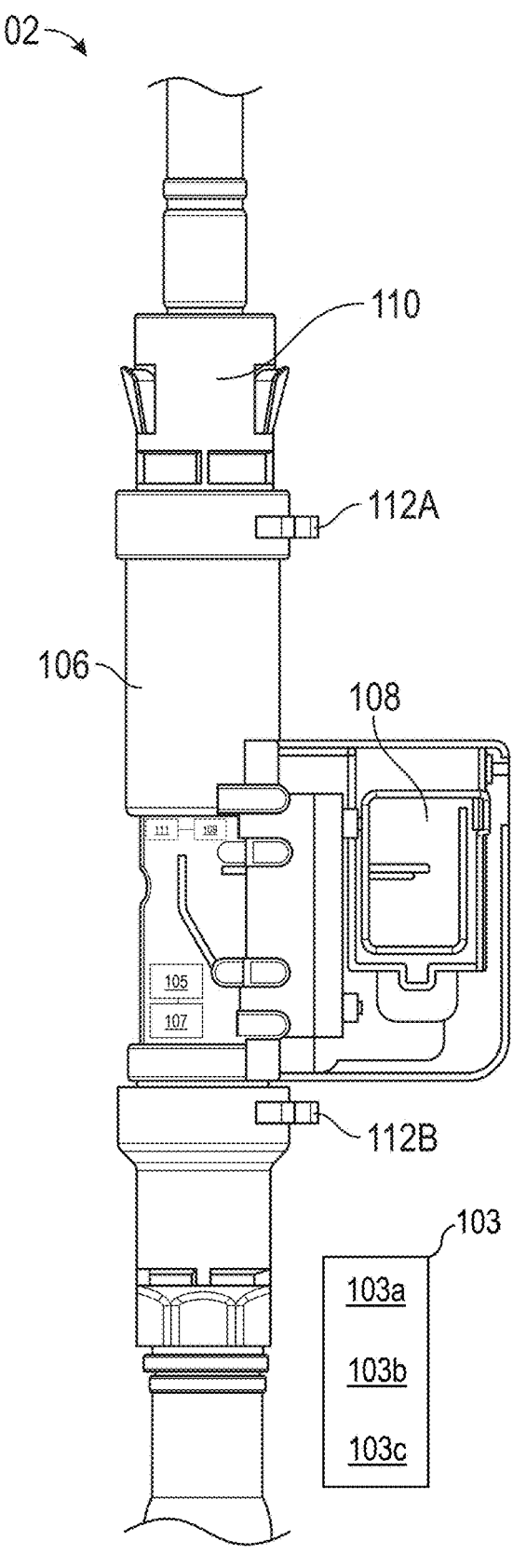
FIG. 1B is a detailed perspective view of the touchless functionality of the touchless faucet system of FIG. 1A when operatively engaged with the touchless faucet system.
Figure 1C:
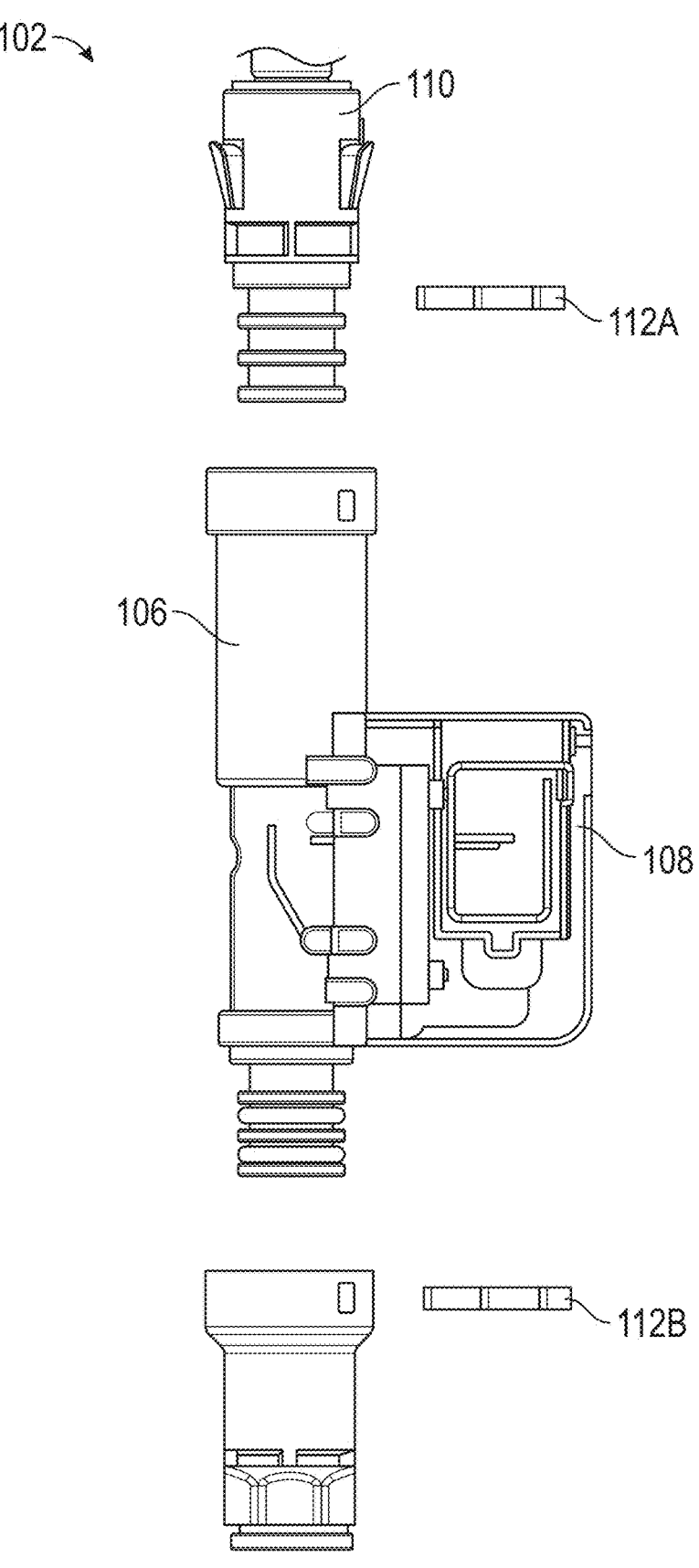
FIG. 1C is an exploded, detailed perspective view of the touchless functionality of the touchless faucet system FIG. 1A in the process of being operatively disengaged using the mechanical bypass mechanism.
Figure 1D:
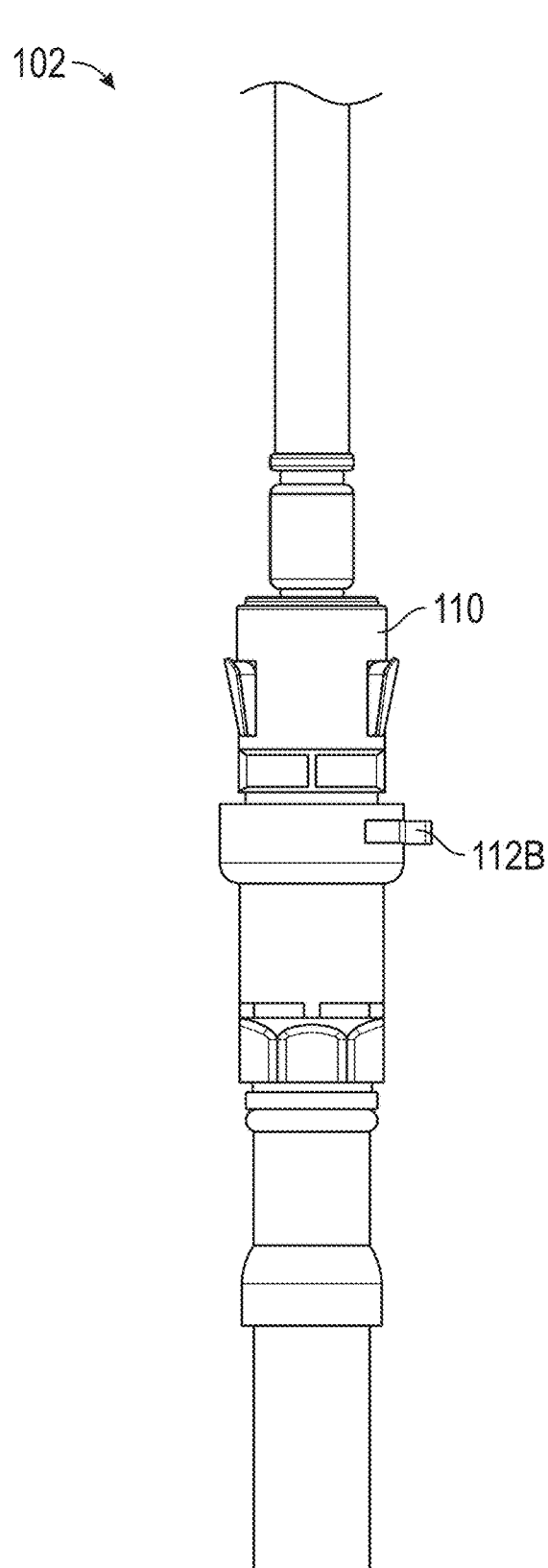
FIG. 1D is a detailed perspective view of the touchless faucet system of FIG. 1A after the touchless functionality is disconnected and water flow through the touchless faucet system is enabled using the mechanical bypass mechanism.
Figure 2:
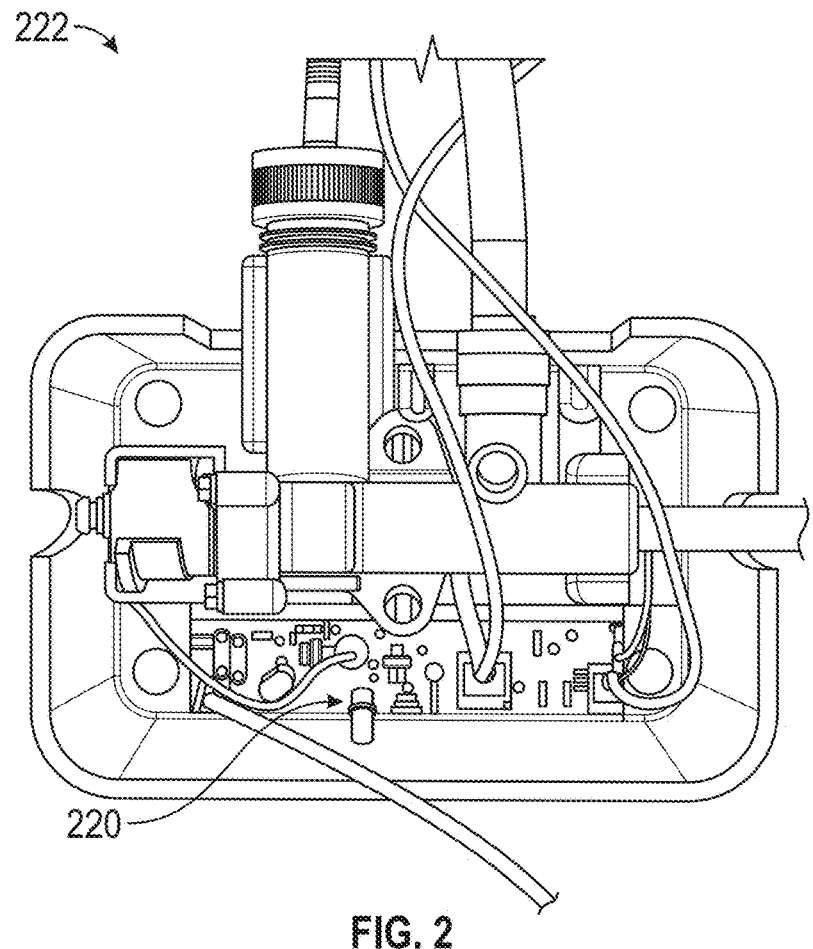
FIG. 2 is a photograph of a visual indicator within a touchless faucet system employing a manual override system of the disclosure that facilitates signaling to the user that status of the touchless faucet system has changed.

FIGS. 1B-1D demonstrate how the mechanical touchless faucet override system 100 may be utilized to bypass the touchless electrical control 102. In an instance where the touchless faucet system 100 loses functionality, for any reason, the channel 110 and the touchless electronic control 102 can be removed from the touchless faucet system 100, demonstrated in FIG. 1B. Removing the plurality of security clips 112A and 112B allows the channel 110 and the touchless electrical control 102 to detach from the distal end fitting 106 and the proximal end fitting 108. When the channel 110 and the touchless electrical control 102 are detached from the touchless faucet system 100, the proximal end fitting 108 may be affixed to the distal end fitting 106 to connect the water source with the faucet body, demonstrated in FIG. 1C. In this example, the proximal end fitting 108 can be fit into the opening of the distal end fitting 106 and secured with the security clip 112A on the distal end fitting 106. Connecting the components in such a way reestablishes the fluid supply to the touchless faucet system 100 by mechanical means, which can be directed by a switch (not pictured) located on the faucet body.

Figure 3A:
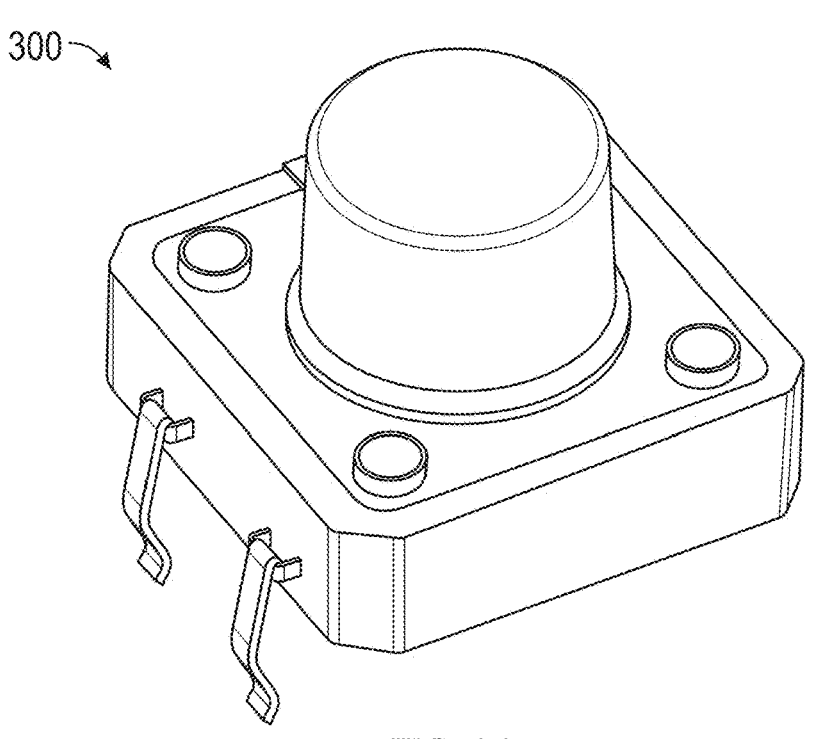
FIG. 3A is a perspective view of an exemplary control box that is part of the electronic touchless faucet override system.
Figure 3B:
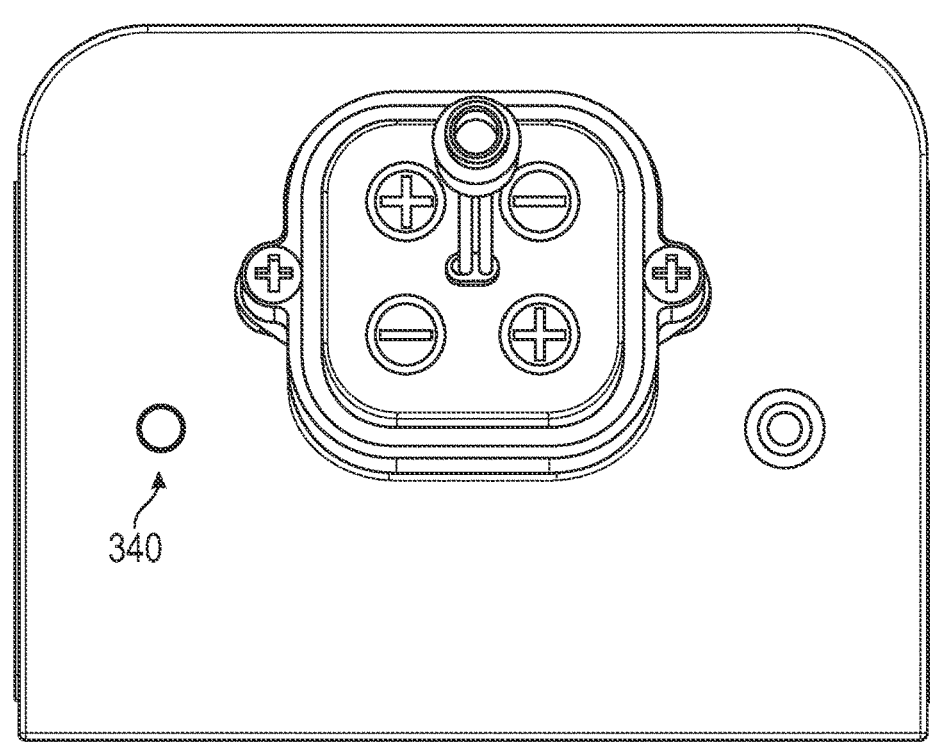
FIG. 3B is a front view of an exemplary button to control the electronic touchless faucet override system.
Figure 3C:
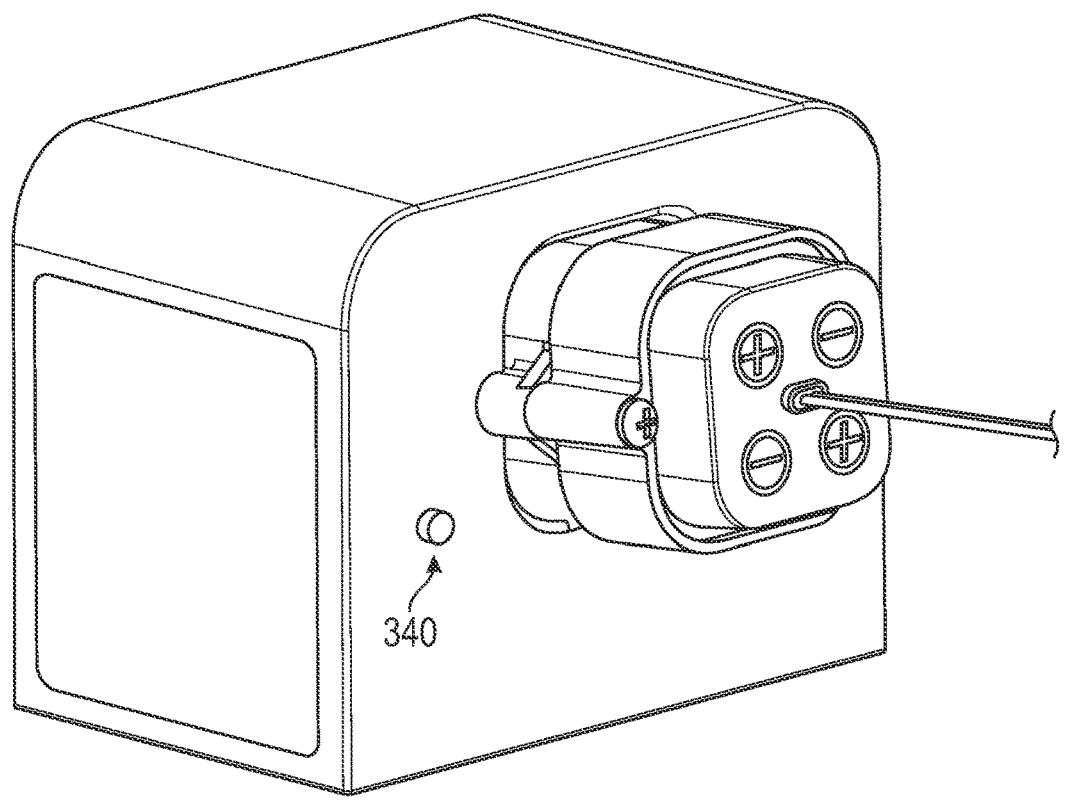
FIG. 3C is a perspective view of the exemplary button to control the electronic touchless faucet override system of FIG. 3B.

FIG. 3A demonstrates an example of an electrical touchless faucet override system 300 installed into the touchless faucet system 100. The electrical touchless faucet override system 300 has generally the same functionality as the mechanical touchless faucet override system 100, except the electrical touchless faucet override system 300 can function via a switch, exemplified in FIGS. 3B and 3C as a button 340. The electrical touchless faucet override system 300 can operate a solenoid 107 (pictured in FIG. 1B) with input from the user interacting with the button 340. The solenoid functions to control the valve 105 (pictured in FIG. 1B) of the touchless faucet system 100 that facilitates the delivery of fluid through the touchless faucet system 100.

The electrical touchless faucet override system 300 can be equipped with an LED light 302 or other visible indicator, visible to the user if the user is looking beneath the deck the touchless faucet system 100 is affixed to. The LED light 302 can be switched on or off, dependent upon input from the touchless faucet system 100 and the electrical touchless faucet override system 300.

In an instance where the touchless functionality of the touchless faucet system 100 fails or if the user desires the touchless functionality to be disable, the electrical touchless faucet override system 300 can facilitate a bypass of the component that controls the touchless functionality. The user can execute some predetermined action on the button 340 to override the touchless function, such as a specific pattern or number of presses. Executing this specific action can induce the electrical touchless faucet override system 300 to open the solenoid, which is controlled by the touchless functionality of the touchless faucet system 100 when the electrical touchless faucet override system 300 is not engaged. Opening the solenoid by these means in turn opens the valve that controls the flow of water through the touchless faucet system 100. When this valve is opened, the user can then control the touchless faucet system 100 by a manual switch, handle, or other actuator (not pictured) located on the faucet body.

The button 340 can be configured in a variety of manners that can initiate the function of the electrical touchless faucet override system 300. For example, the button 340 can be configured so that the electrical touchless faucet override system 300 will only be initiated when the user presses and holds the button 340 in a compressed position for at least three seconds. In another exemplary system, the user must press the button 340 three times in quick succession in order to initiate the functionality of the electric touchless faucet override system 300.

There is a variety of circumstances in which the electrical override system 300 may be configured to activate the LED light 302, such as: the touchless faucet system 100 has been turned off via the touchless electrical component 102; the touchless faucet system 100 has been turned on via the touchless electrical component 102; the touchless faucet system 100 is pairing with the touchless electrical component 102; the button 340 has been compressed and the electrical touchless faucet override system 300 has been initiated; the button 340 has been compressed and the electrical touchless faucet override system 300 has been disengaged; or the touchless electrical component 102 may have a low battery.

The electrical touchless faucet override system 300 can be configured in a variety of manners in order to result in a variety of desired outputs depending upon anticipated inputs. An exemplary configuration is identified in FIG. 4. In order to carry out the processing identified in FIG. 4, electrical touchless faucet override system 300 and, more specifically, electrical control 102 may include processing logic 103. Processing logic 103 may include threshold logic 103a, timing or inquiry logic 103b, control output logic 103c, or any other logic necessary to carry out the identified processing of FIG. 4. In one example, threshold logic 103a may receive an input from faucet assembly 100 indicative of a working condition of faucet assembly 100, compare the received input to a threshold value, and, based on the comparison, generate an output signal for a valve assembly (e.g., a valve 105 and solenoid 107) within electrical touchless faucet override system 300.

Figure 4:
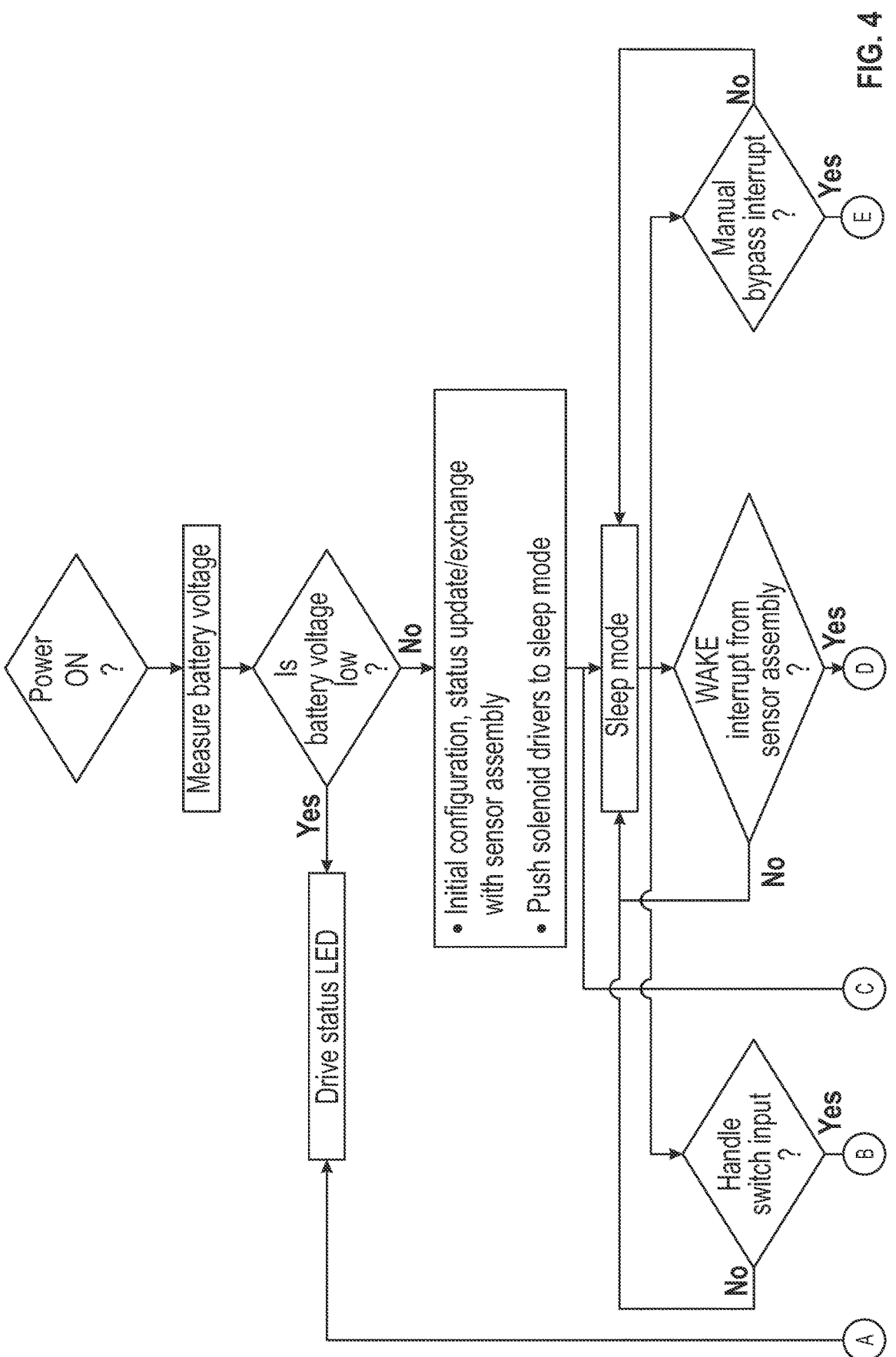
FIG. 4 is an exemplary system flow chart of the electronic override system.
Figure 4:
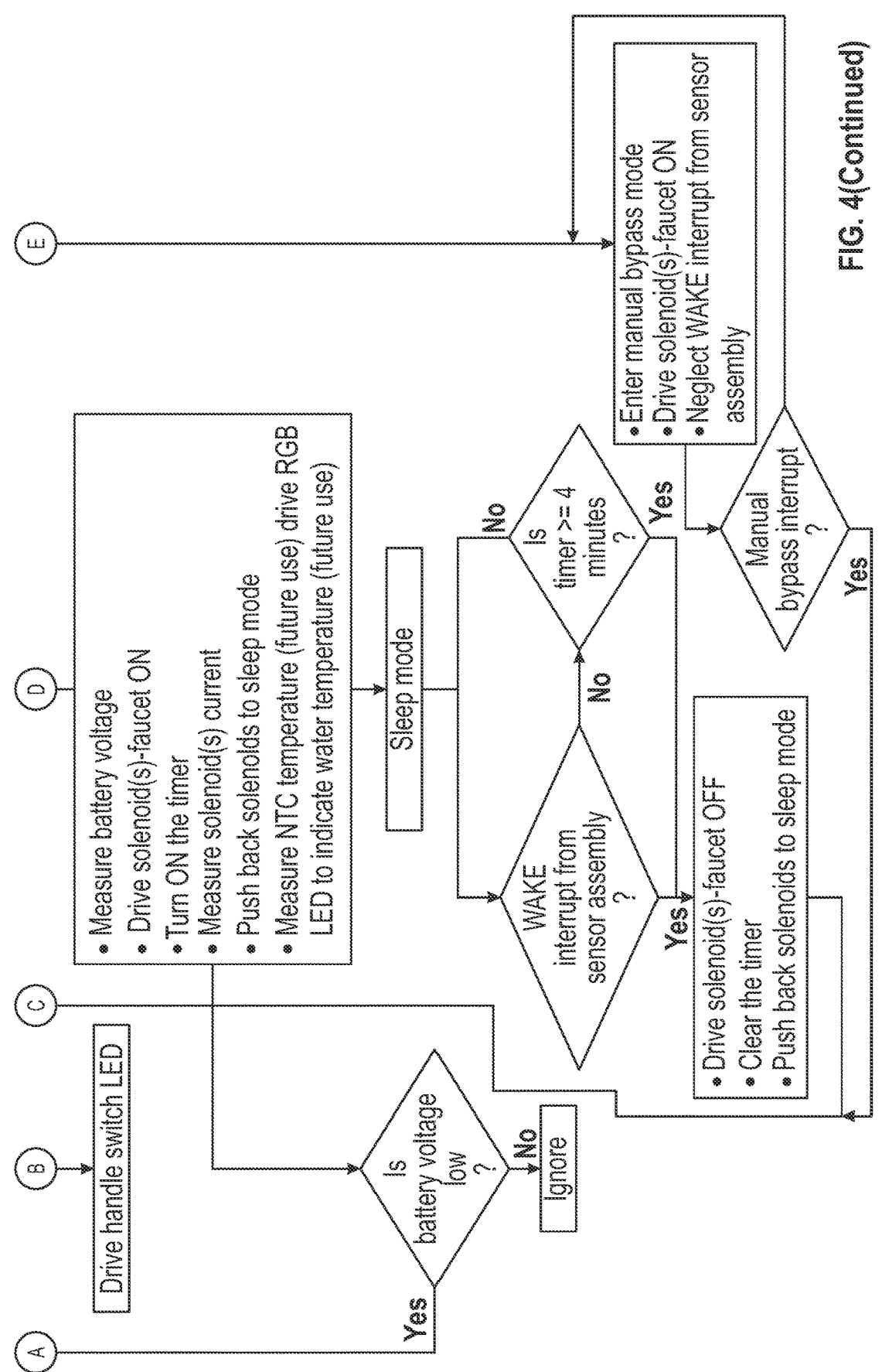

In one exemplary example, faucet assembly 100 may include a touchless faucet system with a sensor assembly 109. Sensor assembly 109 may detect an object proximate to a sensor of the assembly, and, in response, dispense a liquid out of an outlet of touchless faucet system 100. In this example, sensor assembly 109 may operate through electrical power provided from a battery 111 internal or external to the sensor assembly 109. In operation, threshold logic 103*a* of electrical control 102 may receive the input from the sensor assembly 109, indicative of a voltage level of the battery 111 operating the sensor assembly 109 and compare the voltage level to a threshold voltage as indicated in FIG. 4. If the battery voltage is above the threshold value, which, in one example, may be set at 50% of the maximum voltage capacity of the battery 111, the threshold logic 103*a*, or any other logic, may take no action or, as illustratively shown, modify an operating condition of touchless faucet override system 300 from an active to an inactive (e.g., sleep mode) condition. While 50% of maximum capacity is described, it is to be understood that any percentage of battery capacity may be used in accordance with the present invention. Alternatively, if the voltage of the battery 111 is below the threshold value, the threshold logic 103*a* may generate an output signal to control a valve assembly of override system 300 to allow for a flow of liquid within channel 110 and into faucet assembly 100.

Additionally, in one example, electrical control 102 may also include timing or inquiry logic 103*b* configured to generate inquiry signals to the sensor assembly 109 of faucet assembly 100. Inquiry signals may be generated at predefined time periods, and, in response to receiving an inquiry signal, sensor assembly 109 may automatically generate the output signals for the threshold logic 103*a*. However, in other examples, inputs may automatically be provided from sensor assembly 109 to the threshold logic 103*a* whenever override system 300 is connected to faucet assembly 100.

Additionally, as discussed above, touchless faucet override system 300 may also include a user actuation mechanism (e.g., button 340, switch, etc.) that automatically results in the generation of the output to the valve assembly. In this example, valve assembly may be operated through the user input and, as a result, no inputs are necessary from the sensor assembly 109 to allow for a flow of liquid through channel 110. While threshold logic 103*a* and timing or inquiry logic 103*b* have been discussed, it is to be understood that a wide variety of other logic or components may be included within electrical control 102 to carry out the processing indicated in FIG. 4.

In another example, the threshold logic 103*a* of electrical control 102 can trigger the LED light 302 in order to alert the user to the status of the battery 111. Light 302 may emit different wavelengths depending on a determined voltage level of the battery 111. Moreover, as discussed briefly above, if the battery voltage is not low, the electrical touchless faucet override system 300 can be configured to go into a "sleep mode", which the electrical touchless faucet override system 300 can be "woken" from if it receives one of several possible inputs. One such possible input is the compression of the user actuation mechanism (e.g., button 306) by the user, which can trigger the electrical touchless faucet override system 300 to bypass the touchless electrical component 102 and open the solenoids that control the water flow to the touchless faucet system 100. This allows the user to operate the touchless faucet system 100 manually.

The touchless faucet override systems disclosed herein include various means by which to bypass the touchless sensors that control the water flow through a touchless faucet system. This can allow a user to continue to operate a touchless faucet system by manual means in an instance where the touchless sensors are inoperable.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described a claim are considered to be within the scope of the invention as recited in appended.

It should be noted that the term "exemplary" as used herein to describe various examples is intended to indicate that such examples are possible examples, representations, and/or illustrations of possible examples (and such term is not intended to denote that such examples are necessarily extraordinary or superlative examples).

The terms "coupled", "connected" and the like, as used herein, mean the joining of tow members directly or indirectly to one another. Such joining may be achieved with the two members, or the two members and any additional intermediate members being integrally formed as a single unitary body with on another or with the two members or the two members and any additional intermediate members being attached to one another.

References herein to the positions of elements (e.g., "top", "bottom", "above", "below", etc.) are merely used to describe the orientation of various elements in FIGURES. It should be noted that the orientation of various elements in FIGURES. It should be noted that the orientation of various elements may differ according to other examples, and that such variations are intended to be encompassed by the present disclosure.

It is important to note that the construction and arrangement of the assembly as shown in examples is illustrative only. Although only a few examples have been described in detail in this disclosure, those skilled in the art who review this disclosure will readily appreciate that man modifications are possible (e.g., variations in sizes, dimensions, structures, shapes and proportions of the various elements, values or parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature of number of discrete elements or positions may be altered or varied. Other substitutions, modifications, changes, and omissions may be made in the design, operating conditions and arrangement of the various examples without departing from the scope of the present invention. For example, any element disclosed in one example may be incorporated or utilized with any other example disclosed herein.

The invention claimed is:

1. An override system configured to couple to a touchless faucet system, comprising:

an electrical control configured to generate an output signal based on an input, the input comprising a voltage level of a battery coupled to the electrical control, wherein the output signal is provided to a valve assembly configured to control a flow of fluid through a channel of the override system, wherein the input is generated from a sensor assembly of the touchless faucet system, and wherein the input is a voltage level of a battery coupled to the sensor assembly, wherein the electrical control comprises threshold logic configured to receive the input from the sensor assembly of the voltage level of the battery, compare the input to a threshold voltage level, and based on a determination that the voltage level of the battery is below the threshold voltage level, generate an output signal to:

cause the valve assembly to operate in an open position permitting manual operation of the faucet system; and cause the override system to enter an inactive mode.

2. The override system of claim 1, wherein the valve assembly comprises a solenoid coupled to a valve.

3. The override system of claim 2, wherein the output signal comprises an electrical signal provided to the solenoid, and, wherein, upon receiving the electrical signal, the solenoid automatically controls the valve to allow for the flow of fluid through the channel of the override system and into the faucet system.

4. The override system of claim 1, wherein the input is automatically generated and provided from the faucet system to the electrical control while the override system is coupled to the faucet system.

5. The override system of claim 1, further comprising:

a user actuation mechanism coupled to the override system configured to receive a user input, and, wherein, upon receiving the user input, the electrical control automatically generates the output signal to the valve assembly of the override system.

6. The override system of claim 1, wherein the threshold voltage level comprises less than 50% of the total voltage capacity of the battery.

7. The override system of claim 1, wherein the electrical control comprises:

timing logic configured to generate an inquiry signal to the sensor assembly over a predefined period, and wherein, in response to receiving the inquiry signal, the sensor assembly generates the input for the threshold logic of the override system.

8. The override system of claim 1, further comprising:

a distal end fitting coupled to the electrical control configured to couple the override system to the faucet assembly; and a proximal end fitting coupled to the electrical control configured to couple the override system to a fluid source.

9. A method for operating a touchless faucet assembly coupled to an override system, comprising:

receiving an input from a sensor assembly of the touchless faucet assembly of a voltage level of a battery coupled to the sensor assembly;

comparing the input voltage level to a stored threshold voltage value; and based on the comparison of the input to the stored threshold voltage value, generating an output for a valve assembly to operate in an open position permitting manual operation of the touchless faucet assembly when the input voltage level is below the threshold voltage value, the valve assembly being configured to control a flow of fluid to the faucet assembly, and generating an output to cause the override system to enter an inactive mode.

10. The method of claim 9, wherein generating the output for the valve assembly comprises:

an electrical output for a solenoid of the valve assembly.

11. A faucet system coupled to a fluid source, comprising:

a touchless faucet coupled to a sensor assembly configured to sense a presence of an object proximate to the sensor assembly, and, based on the sensed presence, dispense a fluid from an outlet of the touchless faucet;

a touchless faucet override system coupled to the touchless faucet, the touchless faucet override system comprising:

an electrical control configured to receive an input signal from the sensor assembly of a voltage level of a battery coupled to the sensor assembly, and based on the received input, generate an output for a valve assembly configured to control a passage of the fluid through a channel of the touchless faucet override system and the touchless faucet, wherein the input is generated from a sensor assembly of the touchless faucet system, and wherein the input is a voltage level of a battery coupled to the sensor assembly, wherein the electrical control comprises threshold logic configured to receive the input from the sensor assembly of the voltage level of the battery, compare the input to a threshold voltage level, and based on a determination that the voltage level of the battery is below the threshold voltage level, generate an output signal to:

cause the valve assembly to operate in an open position permitting manual operation of the faucet system; and cause the override system to enter an inactive mode;

a distal end fitting coupled to the electrical control through a first fastener, the distal end fitting configured to couple the touchless faucet to the touchless faucet override system; and a proximal end fitting coupled to the electrical control through a second fastener, the proximal end fitting configured to couple the touchless faucet override system to the fluid source.

12. The faucet system of claim 11, wherein the first and second fasteners comprise at least one clip moveable between a locked and open position, the locked position securely fastening the distal and proximal fittings to the electrical control and the open position allowing for the removal of the proximal and distal fittings from the electrical control.

13. The faucet system of claim 12, wherein the distal and proximal fittings can securely fasten to each other to form a second channel for the fluid between the touchless faucet and the fluid source.

14. The faucet system of claim 11, further comprising a user actuation mechanism coupled to the touchless faucet override system, the user actuation mechanism configured to receive a user input, and, based on the received input, generate a signal to the electrical control to generate the output for the valve assembly.

* * * * *